July 20, 1948. J. MEADE 2,445,490
AUTOMATIC SUCTION MEANS FOR REMOVING EGG LIQUID
Filed May 15, 1945 3 Sheets-Sheet 3
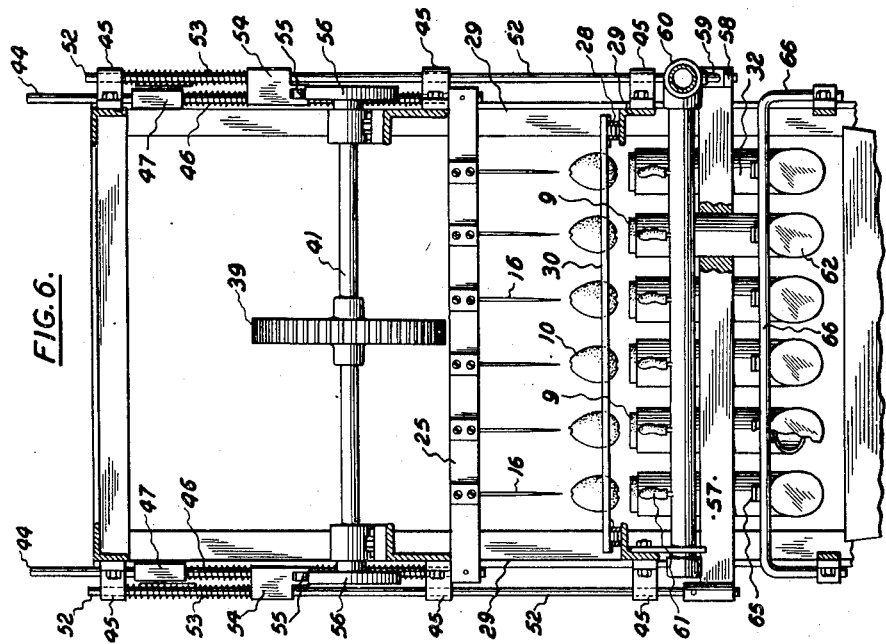
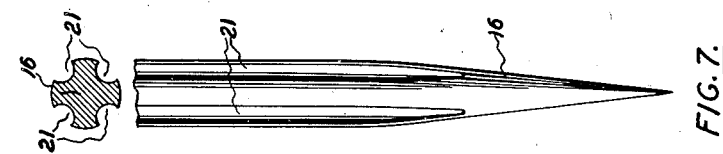 
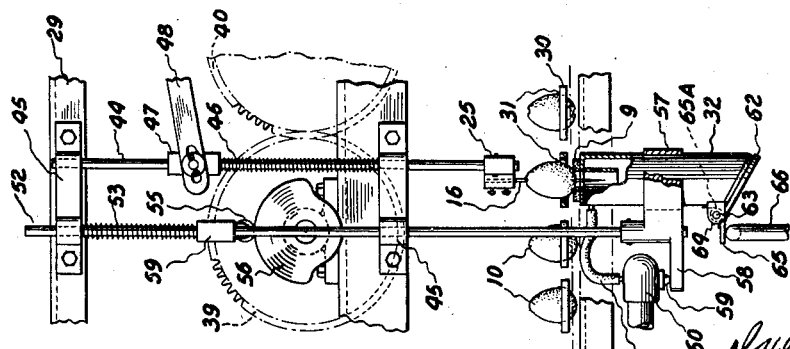

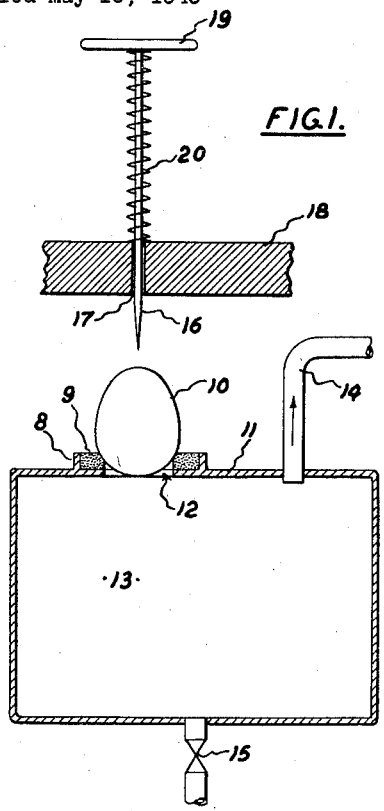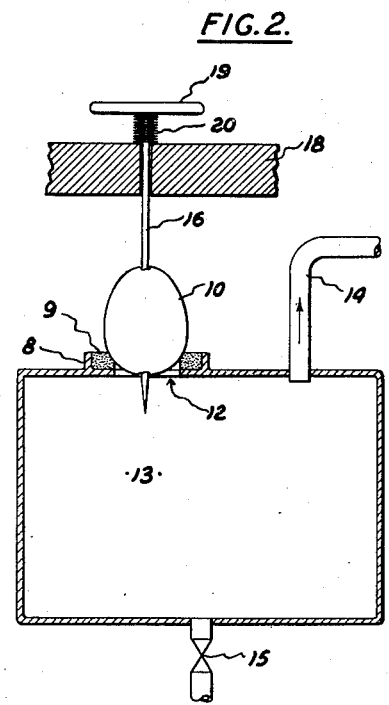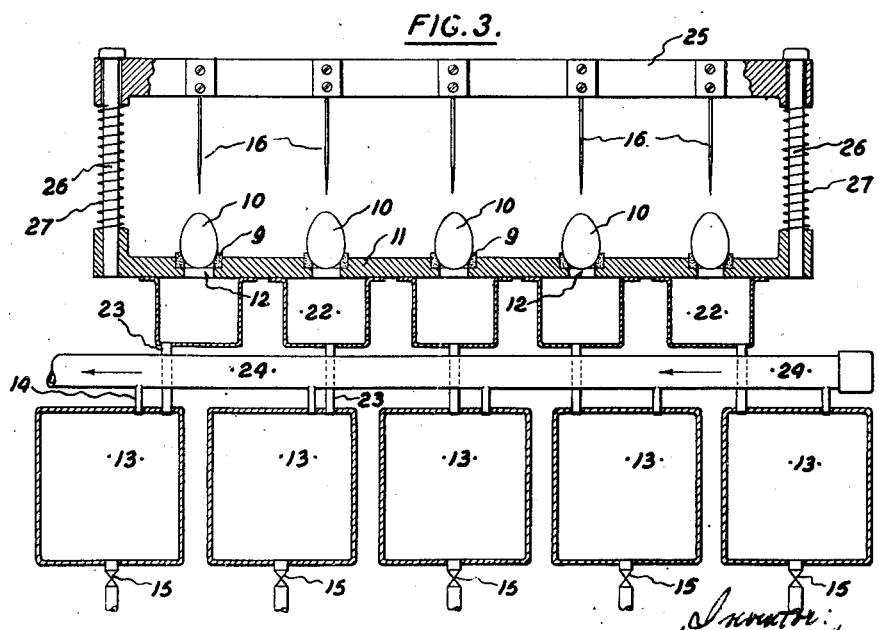

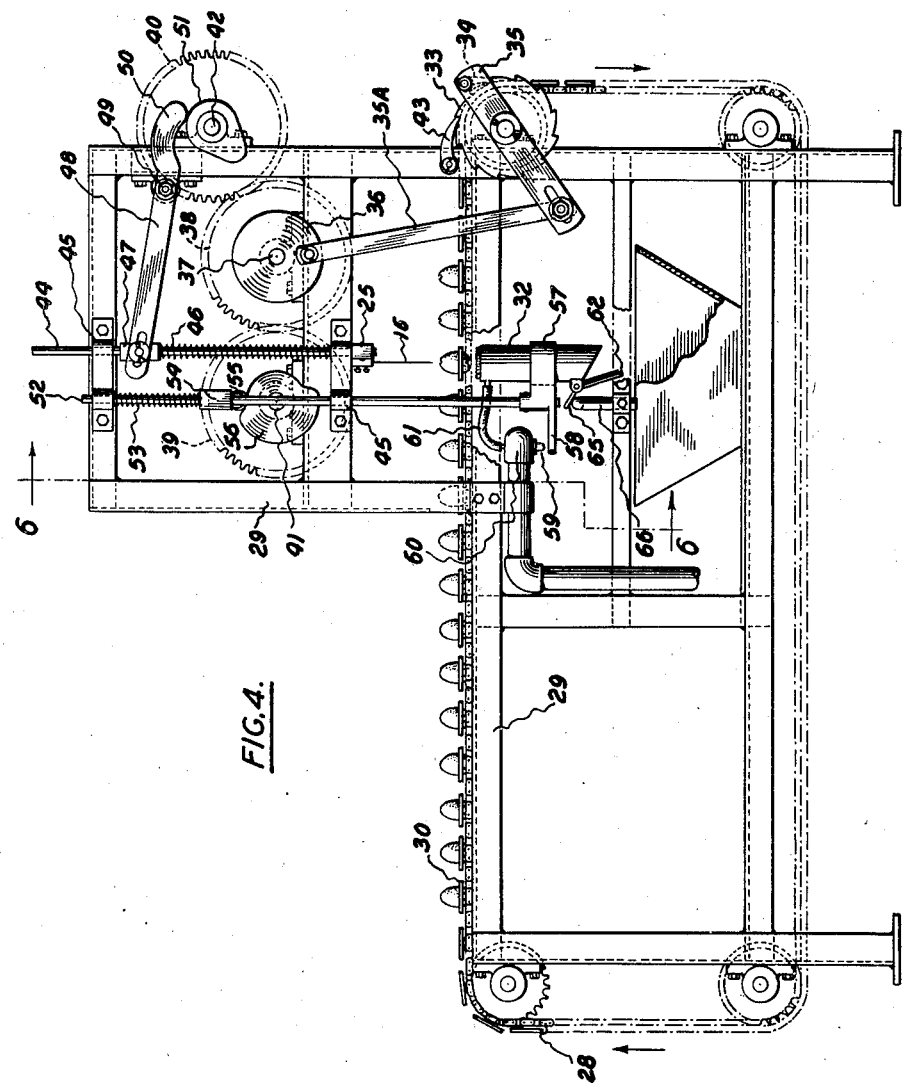

Patented July 20, 1948

2,445,490

UNITED STATES PATENT OFFICE 2,445,490

AUTOMATIC SUCTION MEANS FOR REMOVING EGG LIQUID

John Meade, Erskineville, near Sydney, New South Wales, Australia

Application May 15, 1945, Serial No. 593,940
In Australia May 25, 1944

8 Claims. (Cl. 146—2)

1

This invention relates to the removal of the content of eggs.

The invention has been devised to provide a simple and efficient method and rapidly operating means for removing the content of eggs from the shells thereof.

The invention consists in piercing or puncturing the egg through the shell at two opposite points and simultaneously applying vacuum suction at one puncture so as to cause the liquid content of said egg to discharge thereat under compulsion of atmospheric pressure applied at the other puncture.

The means for evacuating the egg consists of a gasket cushioned ring socket within which an egg may be seated, a stiletto or needle adapted to be thrust completely through the seated egg in order to puncture the shell at two opposite points, and vacuum suction devices connecting with the ring socket from a collecting container or the like.

The apparatus for effecting the evacuation in some cases consists of a series or gangs of ring sockets, puncturing needles, and vacuum devices to deal with quantities of eggs.

In certain other constructions the apparatus consists of socket rings mounted upon an endless conveyor adapted to position the eggs in register with piercing needles also having associated means for applying the vacuum suction as the piercing operations are effected.

In order to describe the invention more fully reference will now be made to the accompanying drawings wherein—

Fig. 1 is a sectional elevation depicting somewhat schematically, apparatus constituting an assembly for practising the invention and evacuating one egg at a time, while Fig. 2 is a similar view showing the effecting of the puncturing operation.

Fig. 3 is a sectional elevation showing a plurality of assemblies ganged together.

Fig. 4 is a side elevation of an egg evacuating machine of endless conveyor type, while Fig. 5 is an enlarged detail view of Fig. 4 taken about the puncturing devices and actuation means, and Fig. 6 is a transverse incomplete sectional elevation on line 6—6 of Fig. 4.

Fig. 7 is a modified form of puncturing needle.

Referring to Figs. 1 and 2 the ring socket consists of a short annular sleeve 8 which is lined with a ring gasket 9 of rubber or the like within which an egg 10 is neatly seated with its major axis substantially vertical. The ring socket 8—9

2 is mounted on a platform 11 having a hole 12 therein more-or-less centrally disposed below said socket 8—9. The platform 11 forms the roof of a catchment jar or container 13 into which the egg liquid discharges and said container has a pipe 14 in the platform 11 connecting to a vacuum pump and an outlet valve 15 is provided in the bottom.

Above the ring socket 8—9 a stiletto 16 is vertically slidable in a guide orifice 17 of a stationary bracket 18. This stiletto 16 has a head 19 on its upper end whereby it may be descended by pressure either manually or by suitable power means, and a return spring 20 is sleeved on the said stiletto 16 between its said head 19 and the bracket 18.

In use an egg 10 to be evacuated is seated in the ring socket 8—9, with its major axis upright as shown in Fig. 1. The gasket 9 in the ring 8 enables this seating to be a fluid-tight seal. The interior of the catchment container 13 is placed under the vacuum applied through the pipe 14 and the stiletto 16 is descended so that the egg shell is punctured at its two ends in or in the vicinity of its major axis as shown in Fig. 2. The vacuous suction on the bottom puncture and the atmospheric pressure exerted through the top puncture, rapidly evacuate the egg liquid from the shell and effects discharge thereof into the catchment container 13, the stiletto 16 having reverted to its initial position under the influence of its return spring 20.

The stiletto 16 is of plain stemmed needle-like form but it may have a series of longitudinal grooves 21 formed therein as shown in Fig. 7 in order to enable or facilitate entrance of atmospheric air into the shell prior to complete withdrawal of the stiletto therefrom.

The assembly described above enables only one egg 10 to be dealt with at a time and in Fig. 3 a ganged arrangement is shown wherein a series of ring sockets are disposed in line and such sockets are each formed of a gasket 9 seated in a ring-like groove on the platform 11 about a hole 12. In this construction the egg liquid discharges into a sub-chamber or vessel 22 fitted under the platform 11 and each connected by a discharge pipe 23 to a catchment container 13 to which suction pipes 14 connect from a common vacuum suction pipe 24.

The stilettos 16 are mounted on a horizontally set beam 25 mounted on end guide rods 26 from the platform 11 and having return springs 27. The stilettos 16 are affixed centrally over each socket and the beam 25 may be actuated manually or by power means as desired.

In the above described gang assembly provision is made in the vacuum suction line to ensure substantial equalisation of vacuum in all the vessels 22.

Referring to Figs. 4, 5 and 6 the machine shown for dealing with large quantities of eggs consists of an endless conveyor 28 mounted upon a machine framing 29. This conveyor 28 has a series of slotted egg holding platform bars 30 transversely mounted thereacross at suitable intervals apart and the slots 31 adapted to each receive an egg 10 are arranged in line across each said bar 30 and the lines carried by each said bar 30 are adapted to be successively positioned over a series of resilient sealing gaskets 9 each set in the orificed top of a receiving cylinder 32 later referred to.

The conveyor 28 is intermittently traversed by a ratchet wheel 33 mounted at one side and end of the framing engaged by a pawl 34 carried on a rocking bar 35 pivoting on the mounting shaft of said wheel 33 and at its lower end has the lower end of a connecting rod 35A coupled thereto, such rod 35A extending from the pin of a crank disc 36 fitted on a drive shaft 37 receiving its drive from any suitable drive unit. This drive shaft 37 carries a gear 38 engaging gears 39 and 40 on intermediate shafts 41 and 42 respectively. A retention or non-return pawl 43 is mounted on the framing to engage the wheel 33.

A line of stilettos 16 is carried in holders on the beam 25 with each stiletto centrally positioned over the related gasket 9. The beam is carried at each end upon vertical rods 44 slidably set in bearings 45 and both such rods 44 have return springs 46 taking at top under a sleeve 47 (affixed to each said rod 44) and from the outside of which a rocker arm 48 (pivoted at that end thereto through a slot) leads past a fulcrum point 49 to a cam contact end 50 contacting a cam 51 on the shaft 42 to effect the depression of the stilettos 16 for puncturing the eggs in the cycle of operations later described.

Outwardly of each end of the shaft 41 a carrier rod 52 is slidably set in extensions of the bearings 45 and is adapted to be depressed by a spring 53 bearing at its lower end upon a block 54 (on said rod 52) carrying a contact roller 55 taking on a cam 56 mounted on the shaft 41.

The cylinders 32 are carried upon a cross bracket 57 mounted upon the ends of the carrier rods 52 and there is a rearward bracket tail 58 for actuating the stem of a valve 59 in a header casing 60 connected to a source of vacuum suction. Flexible tubes 61 connect from points on the header casing 60 to each of the cylinders 32.

The cylinders 32 each have an angularly cut open bottom and adapted to be closed by a flap 62 hinged on a cross pin 63 in lugs 64 from the related cylinder 32 and a spring 65A is associated with said pin 63 (see Fig. 5) for normally closing said flap 62. The flap 62 has a tail lug 65, which, when the cylinders 32 are lowered, contacts a cross bar 66 which opens all the flaps 62.

In the operation of this machine the conveyor 28 is moved along by part rotation of the ratchet wheel 33 receiving its movement through pawl 34 and associated parts to successively position each row of eggs 10 in the platform bars 30 under the battery of stilettos 16 which are adapted to be brought down to effect the puncturing of the aligned row of eggs. The carrier rods 52 lift the cylinders 32 up, pressing the gaskets 9 against each egg, the flaps 62 closing and the valve 59 opening by contact of the tail 58 thereagainst and exerting vacuum suction in the said cylinders 32. The stilettos function and the egg content is evacuated into the cylinders 32, and when the rods 52 descend as their cams 56 move around, the springs 53 exerting their pressure lower the said cylinders 32, the vacuum suction is shut off, the flaps 62 open, and the content is discharged into an open topped container 67.

The above constructional examples are in no manner exhaustive of the ways in which the invention may be applied and the application of said invention is not limited thereto.

I claim:

1. In a machine for evacuating the contents of an egg, a container having a cushioned aperture at its upper end and vacuum suction connection adjacent to its upper end, a needle disposed above said aperture, an endless conveyor having spaced supports thereon adapted to seat an egg with portion of said egg depending from said support, means to intermittently advance said conveyor to successively position said supports between said container and said needle, means to raise said container and simultaneously apply vacuum suction thereto, means to advance said needle through said support and aperture and then withdraw said needle, and means to lower said container and cut off said vacuum suction whereby an egg seated on a said support and advanced to a position between said needle and said container is contacted at its depending portion by said cushioned aperture, pierced by said needle and its contents simultaneously passed into said container.

2. In a machine for evacuating the contents of eggs, a row of containers, each container having a cushioned aperture at its upper end and vacuum suction connection adjacent to its upper end, a row of needles disposed above said containers, an endless conveyor characterized by transverse bars, each bar having a row of holes therein forming seatings for eggs with portion of said eggs depending from the underside of said bar, means to successively position each bar containing a row of eggs between said needles and containers, means to raise said containers whereby each said cushioned aperture is adapted to contact the depending portion of an egg and slightly raise said egg from its seating, means to apply vacuum suction to said containers during their upward movement whereby said eggs are retained on said cushioned apertures, and means to advance said needles downwardly through said eggs and withdraw said needles, the contents of said eggs being simultaneously evacuated into said containers.

3. In a machine for evacuating the contents of eggs, a series of containers, each container having a cushioned aperture at its upper end, a spring loaded flap at its lower end and vacuum suction connection adjacent to said aperture, a series of needles disposed above said containers, an endless conveyor adapted to traverse between said containers and said needles and having transverse bars secured thereto at spaced intervals, each bar having a series of holes therein to receive a series of eggs with portion of each of said eggs depending from said bar, means to intermittently traverse said conveyor and successively position series of eggs in said bars between said containers and needles, means operative after each traversing movement of said conveyor to raise said containers, whereby said eggs are respectively positioned on a said cushioned socket of said containers to simultaneously open a valve to apply vacuum suction to said containers, to advance said needles downwardly through said eggs and into said containers and then withdraw said needles, the contents of said eggs being evacuated into said containers during said advancing and withdrawing and to return said containers whereby said valve is closed and said flap is opened and the contents of said eggs are discharged by gravity from said containers.

4. In a machine for evacuating the contents of eggs, a row of vertically disposed cylindrical containers, each container having a cushioned aperture at its upper end, a spring loaded flap at its lower end normally held open by means of an abutment and vacuum suction connection adjacent to said aperture, a row of needles corresponding in number and spacing to said cylinders, each said needle being disposed above and in axial alignment with a said cylinder, an endless conveyor having transverse bars secured thereto at spaced intervals, each bar having formed therein a row of holes corresponding in number and spacing to said needles, each hole being of a size to seat an egg therein so as to have portion of said egg extending below said bar, means to intermittently traverse said conveyor so as to have portion of said egg extending below said bar, means to intermittently traverse said conveyor so as to successively position said bars between said needles and containers with their holes in axial alignment with respective needles, means operative after each traversing movement of said conveyor to raise said containers, advance said needles downwardly through said holes and apertures, return said needles, and return said containers whereby said flaps close by spring means, vacuum suction is applied to said containers by the opening of a valve during the upward movement of said containers, eggs seated in the holes in a said axial aligned bar are slightly raised from their seating by the contact of said cushioned apertures with the portions of said eggs depending from said bars and said eggs are retained on said cushioned apertures by vacuum suction, said needles pass through said eggs and withdraw and simultaneously the contents of said eggs are evacuated into said containers, vacuum suction is shut off from said containers and said flaps are opened against spring pressure and the contents of said eggs are gravitationally discharged from said containers.

5. In a machine for evacuating the contents of eggs according to claim 1, wherein said needles are characterized by having longitudinal grooves formed therein.

6. In a machine for evacuating the contents of eggs according to claim 2 wherein said needles are characterized by having longitudinal grooves formed therein.

7. In a machine for evacuating the contents of eggs according to claim 3, wherein said needles are characterized by having longitudinal grooves formed therein.

8. In a machine for evacuating the contents of eggs according to claim 4, wherein said needles are characterized by having longitudinal grooves formed therein.

JOHN MEADE.

REFERENCES CITED

The following references are of record in the file of this patent:

UNITED STATES PATENTS

| Number | Name | Date |
| --- | --- | --- |
| 1,837,357 | Chapman | Dec. 22, 1931 |
| 1,997,881 | Drexel | Apr. 16, 1935 |
| 2,206,960 | Irish | July 9, 1940 |
| 2,224,941 | Weimer | Dec. 17, 1940 |
| 2,269,254 | Cribb | Jan. 6, 1942 |

FOREIGN PATENTS

| Number | Country | Date |
| --- | --- | --- |
| 180,503 | Germany | Jan. 17, 1907 |
| 104,515 | Switzerland | Apr. 16, 1924 |